(12) United States Patent
Bregman et al.

(10) Patent No.: US 10,769,055 B2
(45) Date of Patent: Sep. 8, 2020

(54) DYNAMICALLY REVISING AN IN-PROCESS BUILD

(71) Applicant: Red Hat Israel, Ltd., Raanana (IL)

(72) Inventors: Arie Bregman, Raanana (IL); Nir Magnezi, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 49 days.

(21) Appl. No.: 16/111,296

(22) Filed: Aug. 24, 2018

(65) Prior Publication Data

US 2020/0065078 A1  Feb. 27, 2020

(51) Int. Cl.
| | |
|---|---|
| G06F 11/36 | (2006.01) |
| G06F 8/41 | (2018.01) |
| G06F 8/60 | (2018.01) |
| G06F 8/70 | (2018.01) |

(52) U.S. Cl.
CPC ............ *G06F 11/3668* (2013.01); *G06F 8/41* (2013.01); *G06F 8/423* (2013.01); *G06F 8/447* (2013.01); *G06F 8/48* (2013.01); *G06F 8/60* (2013.01); *G06F 8/70* (2013.01); *G06F 11/36* (2013.01); *G06F 11/368* (2013.01); *G06F 11/3664* (2013.01); *G06F 11/3672* (2013.01); *G06F 11/3684* (2013.01)

(58) Field of Classification Search
None
See application file for complete search history.

(56) References Cited

U.S. PATENT DOCUMENTS

| | | |
|---|---|---|
| 9,134,965 B2 | 9/2015 | Ravel |
| 9,207,931 B2 | 12/2015 | Fox et al. |
| 2015/0339119 A1 | 11/2015 | Rehman et al. |
| 2017/0249141 A1 | 8/2017 | Parees et al. |
| 2017/0371639 A1 | 12/2017 | Simek et al. |
| 2018/0060066 A1* | 3/2018 | Rihani ................ G06F 8/71 |
| 2018/0088929 A1 | 3/2018 | Eberlein et al. |

OTHER PUBLICATIONS

Chawla, A., "Dev-Test-Ops: The Way Forward for Continuous Integration & Continuous Delivery (CI/CD)," To the New Blog, Oct. 11, 22017, pp. 1-8.
Melendez, C., "Amplify Feedback With Continuous Performance," DZone Performance, May 16, 20018, pp. 1-6.

* cited by examiner

*Primary Examiner* — Duy Khuong T Nguyen
*Assistant Examiner* — Mark A Gooray
(74) *Attorney, Agent, or Firm* — Withrow & Terranova, PLLC

(57) ABSTRACT

Dynamically revising an in-process build is disclosed. A build system receives a build configuration comprising information that defines a plurality of successive stages. Each stage includes at least one step, and one or more of the stages include a plurality of successive steps. The build configuration defines a build process that, when completed, alters a state of a storage device. The build system initiates a build process sequence on the build configuration. The build system, after initiating the build process sequence, receives notification of a desire to add a revision to a particular stage of the plurality of stages defined in the build configuration. A determination is made that performance of the particular stage has or has not begun. In response to the determination, a subsequent build process action is performed.

12 Claims, 6 Drawing Sheets

DYNAMICALLY REVISING AN IN-PROCESS BUILD

TECHNICAL FIELD

The examples relate generally to software builds, and in particular to dynamically revising an in-process build.

BACKGROUND

A software build process is a computer-implemented staged process involving a successive series of steps defined in a build configuration to create a particular state on a storage device. The build process itself may be a sequence of multiple phases, such as a queue phase and an execution phase. During the execution phase, a build executor reads the build configuration and performs each identified step. Depending on the length of the queue, the complexity and/or magnitude of the steps in the build configuration, and a variety of other factors, the build process may take a relatively long time to complete.

SUMMARY

The examples implement mechanisms for dynamically revising an in-process build. In particular, the examples facilitate the real-time modification of a build configuration even after the build process has been initiated, whether the build configuration is in a queue phase or an execution phase. Among other advantages, the examples substantially reduce software development and/or implementation time by eliminating a need to restart a build process to incorporate a modification of a stage of a build configuration that the build executor has not yet begun performing.

In one example, a method is provided. The method includes receiving, by a build system executing on a computing device comprising a processor device, a build configuration comprising information that defines a plurality of successive stages, each stage comprising at least one step, and one or more of the stages comprising a plurality of successive steps, the build configuration defining a build process that, when completed, alters a state of a storage device. The method further includes initiating, by the build system, a build process sequence on the build configuration. The method further includes receiving, by the build system after initiating the build process sequence, notification of a desire to add a revision to a particular stage of the plurality of stages defined in the build configuration. The method further includes making a determination that performance of the particular stage has or has not begun. The method further includes, in response to the determination, performing a subsequent build process action.

In another example a computing device is provided. The computing device includes a memory, and a processor device coupled to the memory. The processor device is to receive a build configuration comprising information that defines a plurality of successive stages, each stage comprising at least one step, and one or more of the stages comprising a plurality of successive steps, the build configuration defining a build process that, when completed, alters a state of a storage device. The processor device is further to initiate a build process sequence on the build configuration. The processor device is further to receive, after initiating the build process sequence, notification of a desire to add a revision to a particular stage of the plurality of stages defined in the build configuration. The processor device is further to make a determination that the performance of the particular stage has or has not begun. The processor device is further to, in response to the determination, perform a subsequent build process action.

In another example a computer program product is provided. The computer program product is stored on a non-transitory computer-readable storage medium and includes instructions configured to cause a processor device to receive a build configuration comprising information that defines a plurality of successive stages, each stage comprising at least one step, and one or more of the stages comprising a plurality of successive steps, the build configuration defining a build process that, when completed, alters a state of a storage device. The instructions further cause the processor device to initiate a build process sequence on the build configuration. The instructions further cause the processor device to receive, after initiating the build process sequence, notification of a desire to add a revision to a particular stage of the plurality of stages defined in the build configuration. The instructions further cause the processor device to make a determination that the performance of the particular stage has or has not begun. The instructions further cause the processor device to, in response to the determination, perform a subsequent build process action.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
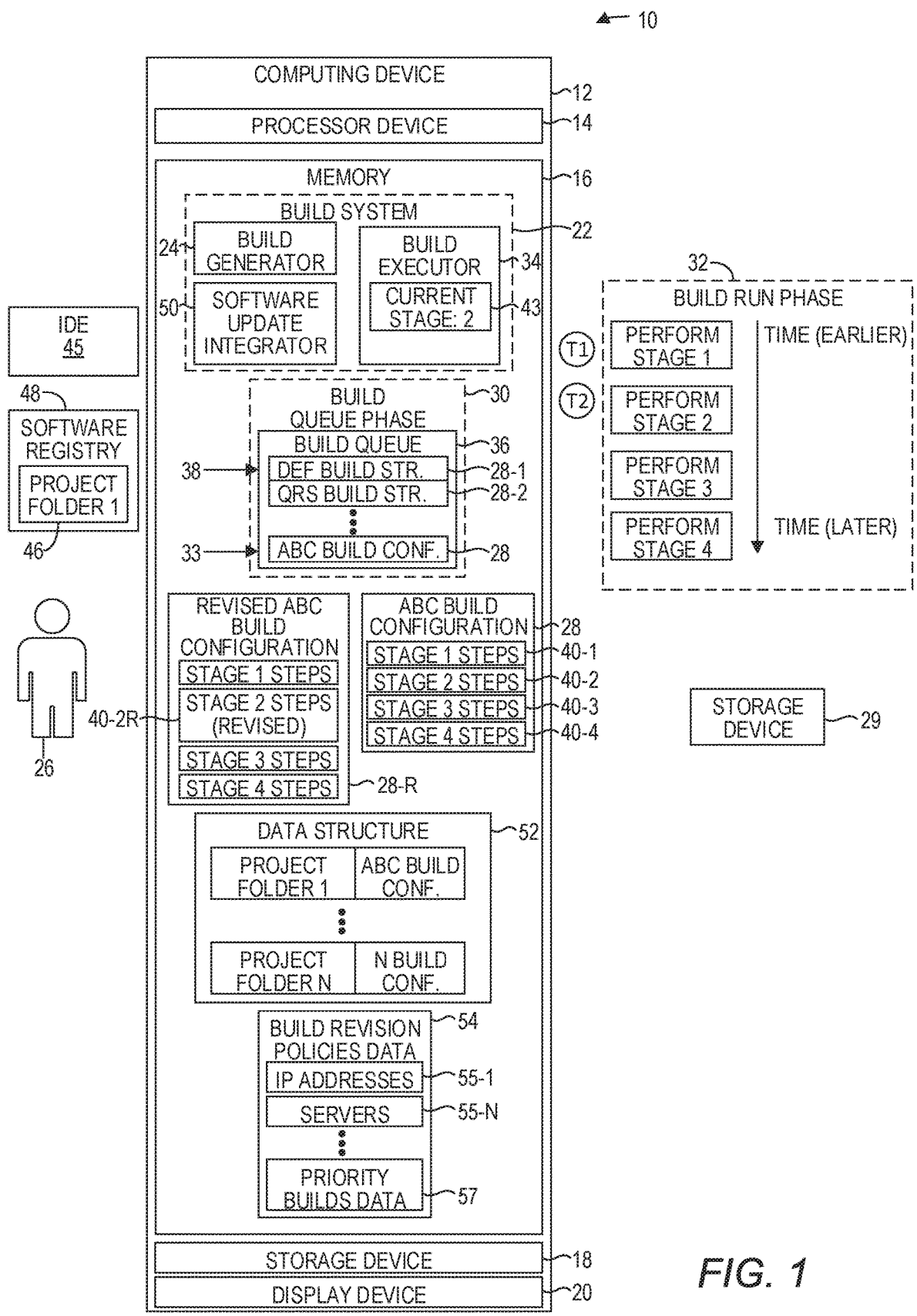
FIG. 1 is a block diagram of an environment in which examples can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

A software build process is a computer-implemented staged process involving a successive series of steps defined in a build configuration to create a particular state on a storage device. The build process itself may be a sequence of multiple phases, such as a queue phase and an execution phase. During the execution phase, a build executor reads the build configuration and performs each identified step. Depending on the length of the queue, the complexity and/or magnitude of the steps in the build configuration, and a variety of other factors, the build process may take a relatively long time to complete.

There are times when a build creator, such as a software developer or operator, realizes, after initiation of the build process but before completion of the build process, that the build configuration needs to be modified. The build creator then terminates the build process, modifies the build configuration, and restarts the build process. The build executor then returns the build configuration to the queue, ultimately removes the build configuration from the queue, and then begins processing the build stages identified in the build configuration. The re-queuing and restarting of the build process often results in a substantial delay, slowing development and/or implementation times.

At times, a build creator may desire to modify a stage identified in the build configuration that has not yet been processed by the build executor. For example, the build executor may have completely performed a first stage of the build configuration, and begun performing a second stage of the build configuration. The build creator desires to modify a fourth stage of the build configuration. Although the build executor has not yet begun processing the fourth stage, the build creator must terminate the build process and start the build process over to implement the revisions to the build configuration. This can result in a substantial amount of wasted time, leading to unnecessarily long development and/or production implementation times.

The examples implement mechanisms for dynamically revising an in-process build. In particular, the examples facilitate the real-time modification of a build configuration even after the build process has been initiated, whether the build configuration is in a queue phase or an execution phase. Among other advantages, the examples substantially reduce software development and/or implementation time by eliminating a need to restart a build process to incorporate a modification of a stage of a build configuration that the build executor has not yet begun performing.

The examples facilitate an improvement to computer functionality itself via a build system that facilitates the real-time modification of a build configuration even after the build process has been initiated. Thus, the examples are directed to specific improvements in computer functionality.

FIG. 1 is a block diagram of an environment 10 in which examples can be practiced. The environment 10 includes a computing device 12 that includes a processor device 14, a memory 16, a storage device 18, and a display device 20. The memory 16 includes a build system 22 that implements aspects of the functionality discussed herein. Because the build system 22 is a component of the computing device 12, functionality implemented by the build system 22 may be attributed herein to the computing device 12 generally. Moreover, in examples where the build system 22 comprises software instructions that program the processor device 14 to carry out functionality discussed herein, functionality implemented by the build system 22 may be attributed herein to the processor device 14.

In one example, the build system 22 includes a build generator 24 with which a user 26 interfaces to generate a build configuration 28 ("ABC Build Configuration"). The build configuration 28 is a data structure, either in-memory or stored on a storage device, such as the storage device 18, which contains information that identifies a plurality of successive stages, each stage having at least one step, and one or more of the stages comprising a plurality of successive steps. The stages and steps identified in the build configuration 28 collectively define a build process that, when completed, alters a state of a storage device 29. Altering the state of the storage device 29 refers to a change in the data maintained on the storage device 29. As an example of such an alteration, the build configuration 28 may result in a new production executable being stored on the storage device 29, a database on the storage device 29 being updated, source code files maintained on the storage device 29 being updated, or any other desired changes to the storage device 29. The build configuration 28 may identify the stages in any desirable manner, such as via labels or other data in the build configuration 28.

In one embodiment, the build generator 24 may lead the user 26 through a series of screens, or forms, presented in a user interface via the display device 20 to allow the user 26 to generate the build configuration 28. Each screen may provide various options for the user 26 to select based on what the user 26 desires to accomplish. As the user 26 selects certain options, the build generator 24 translates the selections into textual commands that are stored in the build configuration 28 to define the particular build process. The build generator 24 may also identify the stages in the build configuration 28, such as via labels, tags, page breaks, or the like. In some examples, the build configuration 28 is in a Jenkinsfile syntax, described, for example, at jenkins.io, but the examples are not limited to any particular build configuration syntax.

The user 26 may direct the build system 22 to start a build process using the build configuration 28. The build system 22, in response, starts a build process sequence that includes a build queue phase 30 and a build run phase 32. Once the build system 22 begins the build process sequence, the build configuration 28 may be described as being an "in-process build." The build system 22 starts the build queue phase 30 by inserting the build configuration 28 (or a reference thereto) at a bottom 33 of a build queue 36.

A build executor 34 iteratively removes a build configuration, such as a build configuration 28-1, from a top 38 of the build queue 36, and initiates the build run phase 32 on the build configuration 28-1. The build executor 34 reads the build configuration 28-1 and processes each stage by performing the steps identified in the build configuration 28-1. As discussed above, each step is an instruction, or command, written in a syntax understood by the build executor 34. The build executor 34 reads each step, processes the step either by performing the step or causing another component to perform the step, and when completed with the entire build configuration 28-1, starts processing the next build configuration at the top 38 of the build queue 36, and repeats the process. In some embodiments, or with regard to certain types of steps, such steps may be initiated in parallel such that multiple steps are processed substantially concurrently.

The build executor 34 ultimately begins processing the build configuration 28 to start the build run phase 32. The build configuration 28 comprises four stages 40-1, 40-2, 40-3 and 40-4 (generally, stages 40). At a time T1, the build executor 34 begins processing the steps of the stage 40-1 (i.e., the first stage, or, sometimes referred to herein as stage 1). For purposes of discussion to highlight aspects of the disclosed examples, several different potential scenarios will be presented. In a first scenario, the user 26 determines that the stage 40-2 of the build configuration 28 should be altered. For example, the stage 40-2 may involve copying files, and the user 26 may decide that a source or destination location of the files should be altered. Or, for example, the stage 40-2 may involve compiling certain software to generate one or more executables, and the user 26 may desire to change one or more aspects of the compile stage.

To implement the revision to the build configuration 28, the user 26 interacts with the build generator 24 (or other component that implements the following described behavior). The user 26 indicates to the build generator 24 that the stage 40-2 of the build configuration 28 is to be changed, such as by modifying one or more steps of the stage 40-2, removing one or more steps of the stage 40-2, adding one or more steps to the stage 40-2, or any combination thereof. The build generator 24 analyzes the revisions to the build configuration 28 and generates information that identifies the revisions, and the locations of the revisions in the build configuration 28. In some examples, the build generator 24 may generate a complete and revised build configuration 28-R that includes the revisions as well as the non-revised portions of the build configuration 28.

The build generator 24 determines that the build process sequence for the build configuration 28 has been initiated. The build generator 24 provides a notification to the build executor 34 of the desired revisions to the build configuration 28, and communicates information that identifies the revision to the build executor 34. In some examples, upon receipt of such a notification, the build executor 34 may halt the build run phase 32 at the current step.

The build executor 34 makes a determination that the build executor 34 has not begun performing the steps of the stage 40-2 (i.e., that stage 2 has not yet begun). In response to the determination, the build executor 34 incorporates the revisions into the particular stage of the build configuration 28, in this example to the stage 40-2. The exact mechanism for incorporating the revisions into the stage 40-2 of the build configuration may differ depending on system design. In one example, the build generator 24 may provide the build executor 34 a replacement stage 40-2R, and the build executor 34 replaces the stage 40-2 with the replacement stage 40-2R. In other examples, the build generator 24 may provide the build executor 34 the entire revised build configuration 28-R, and the build executor 34 may simply use the revised build configuration 28-R in place of the build configuration 28. In yet other examples, the build generator 24 may provide only the revisions that are to be made to the stage 40-2, and the build executor 34 revises the stage 40-2 to incorporate the revisions. The build executor 34 then continues the build run phase 32 from the halted position. Notably, this sequence of events by the build executor 34 eliminated a need to start the build process sequence over, eliminating queue wait times that would otherwise be incurred in the build queue phase 30, and eliminating the time it would take to implement the steps that were already implemented prior to receiving the notification of the revision.

In another scenario, assume again that at the time T1, the build executor 34 begins processing the stage 40-1. However, in this scenario, the user 26 determines that stage 1 of the build configuration 28 should be altered. The user 26 indicates to the build generator 24 that the stage 40-1 (i.e., stage 1) of the build configuration 28 is to be changed, such as by modifying one or more steps of the stage 40-1, removing one or more steps of the stage 40-1, adding one or more steps of the stage 40-1, or any combination thereof. The build generator 24 analyzes the revisions to the build configuration 28 and generates information that identifies the revisions, and the locations of the revisions in the build configuration.

The build generator 24 determines that the build process sequence for the build configuration 28 has been initiated. The build generator 24 provides a notification to the build executor 34 of the desired revisions to the build configuration 28, and communicates information that identifies the revision to the build executor 34. The build executor 34 may halt the build run phase 32 at the current step of the stage 40-1. The build executor 34 makes a determination that the build executor 34 has already begun performing the steps of the stage 40-1 (i.e., that stage 1 has begun). In one example, the build executor 34 may keep track of a current stage via a current stage counter 43. In one example, in response to the determination, the build executor 34 terminates the build process sequence for the build configuration 28. The build executor 34 incorporates the revisions into the particular stage 40 of the build configuration 28, and restarts the build process sequence by inserting the build configuration 28 (or a reference thereto) at the bottom 33 of the build queue 36.

In another example, the build executor 34 may send a message to the build generator 24 that indicates that the build executor 34 cannot incorporate the revisions into the current build process sequence. The build executor 34 provides a user interface to the user 26 requesting an indication of whether the current build process sequence should continue, or whether the current build process sequence should be terminated and then restarted with the revisions to the build configuration 28. If the user 26 indicates that the current build process sequence should continue, the build executor 34 disregards the revisions and continues the build process sequence on the build configuration 28 without the revisions. If the user 26 indicates that the current build process sequence should not continue, the build executor 34 terminates the build process sequence for the build configuration 28, the build executor 34 incorporates the revisions into the particular stage 40 of the build configuration 28, and restarts the build process sequence by inserting the revised build configuration 28 (or a reference thereto) at the bottom 33 of the build queue 36.

In another scenario, assume again that the user 26 directs the build system 22 to start a build process using the build configuration 28. The build system 22, in response, starts the build process sequence by inserting the build configuration 28 (or a reference thereto) at the bottom 33 of the build queue 36. The user 26 determines that the stage 40-1 of the build configuration 28 should be altered. The user 26 indicates to the build generator 24 that the stage 40-1 of the build configuration 28 is to be changed, such as by modifying one or more steps of the stage 40-1, removing one or more steps of the stage 40-1, adding one or more steps to the stage 40-1, or any combination thereof. The build generator 24 analyzes the revisions to the build configuration 28 and generates information that identifies the revisions, and the locations of the revisions in the build configuration 28. The build generator 24 determines that the build process sequence for the build configuration 28 has been initiated. The build generator 24 provides a notification to the build executor 34 of the desired revisions to the build configuration 28, and communicates information that identifies the revision to the build executor 34. The build executor 34 makes a determination that the build configuration 28 is in the build queue 36, and thus that the build executor 34 has not begun the stage 40-1.

In response to the determination, the build executor 34 incorporates the revisions into the particular stage 40-1 of the build configuration 28, maintaining a same location in the build queue 36 of the build configuration 28 after altering the build configuration 28. Thus, for example, if the build configuration 28 at the time of the notification was third of 10 queued build configurations, the build executor 34 does not re-queue the build configuration 28 after incorporating the revision into the build configuration 28, but maintains the build configuration 28 in the third location.

In other examples, the initiation of a build process sequence on the build configuration 28, and revisions to the build configuration 28, may be triggered automatically in response to an event rather than in response to a request from the user 26. In some examples, such events may be generated during the software development process. As an example, the user 26 generates or modifies a source code file via an integrated development environment (IDE) 45. When the user 26 is finished generating or modifying the source code file, the source code file is stored in a project folder 46 of a software registry 48 that maintains source code files associated with a plurality of projects.

A software update integrator 50 monitors, or receives updates from, the software registry 48. Upon determining that a source code file associated with the project folder 46 has been revised, the software update integrator 50 determines whether the project folder 46 has been identified as being associated with a build configuration. For example, the software update integrator 50 may maintain a data structure 52 that contains information that indicates that the build configuration 28 should be initiated upon the updating of any source code file associated with the project folder 46. The software update integrator 50 directs the build system 22 to start a build process using the build configuration 28. The build system 22, in response, starts the build process sequence that includes the build queue phase 30 and the build run phase 32. In particular, the build system 22 starts the build queue phase 30 by inserting the build configuration 28 (or a reference thereto) at the bottom 33 of the build queue 36.

After the build process sequence has begun, the user 26 decides to make another revision to a source code file associated with the project folder 46. After the source code file is updated in the project folder 46, the software update integrator 50 determines that the source code file associated with the project folder 46 has been revised, and the software update integrator 50 determines that the project folder 46 is associated with the build configuration 28. The software update integrator 50 determines a new identifier for the updated source code file. The software update integrator 50 sends a notification to the build executor 34 of the desired revision to the build configuration 28 to identify the new version of the source code file, and communicates information that identifies the revision to the build executor 34. The build executor 34 processes the notification as discussed above with regard to receiving a notification from the build generator 24.

As will be discussed in greater detail with regard to FIG. 4, in some examples, the build executor 34 may access build revision policies data 54 and determine whether a proposed revision to an in-process build should be rejected based on one or more build revision policies 55-1-55-N (generally build revision policies 55). The build revision policies data 54 may be user configurable, and may identify certain types of proposed revisions to an initiated build configuration that will not be permitted. As an example, an IP address build revision policy 55-1 may identify a maximum increase in a number of reserved IP addresses that can be identified in a proposed revision. A servers build revision policy 55-N may identify a maximum increase in a number of servers that can be reserved for use by a build configuration. The build revision policies data 54 may also include priority builds data 57 that identifies certain build configurations that have a priority such that the build configurations are not limited by the build revision policies 55.

Figure 2:
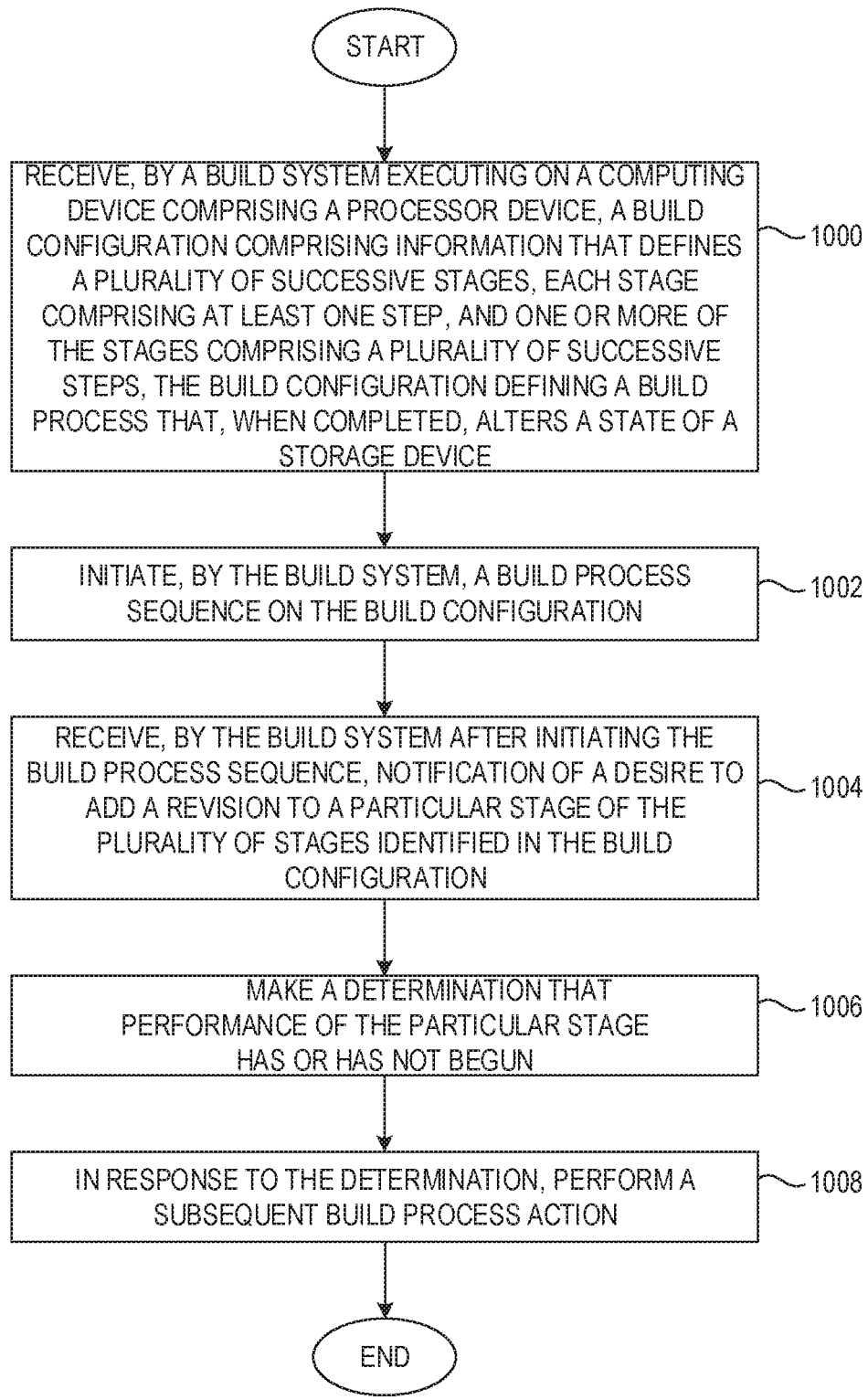
FIG. 2 is a flowchart of a process for dynamically revising an in-process build according to one example.

FIG. 2 is a flowchart of a process for dynamically revising an in-process build according to one example. FIG. 2 will be discussed in conjunction with FIG. 1. The build system 22 receives the build configuration 28 that includes information that identifies the plurality of successive stages 40, each stage 40 comprising at least one step. One or more of the stages 40 comprises a plurality of successive steps. The build configuration 28 defines a build process that, when completed, alters the state of the storage device 29 (FIG. 2, block 1000). The build system 22 initiates the build process sequence on the build configuration 28 (FIG. 2, block 1002). After initiating the build process sequence, the build system 22 receives notification of a desire to add a revision to a particular stage 40 of the plurality of successive stages 40 identified in the build configuration 28 (FIG. 2, block 1004). The build system 22 makes a determination that the build system 22 has or has not begun performing the particular stage 40 (FIG. 2, block 1006). In response to the determination, the build system 22 performs a subsequent build process action (FIG. 2, block 1008). For example, the build system 22 may perform any of the build process actions discussed above with regard to FIG. 1.

Figure 3:
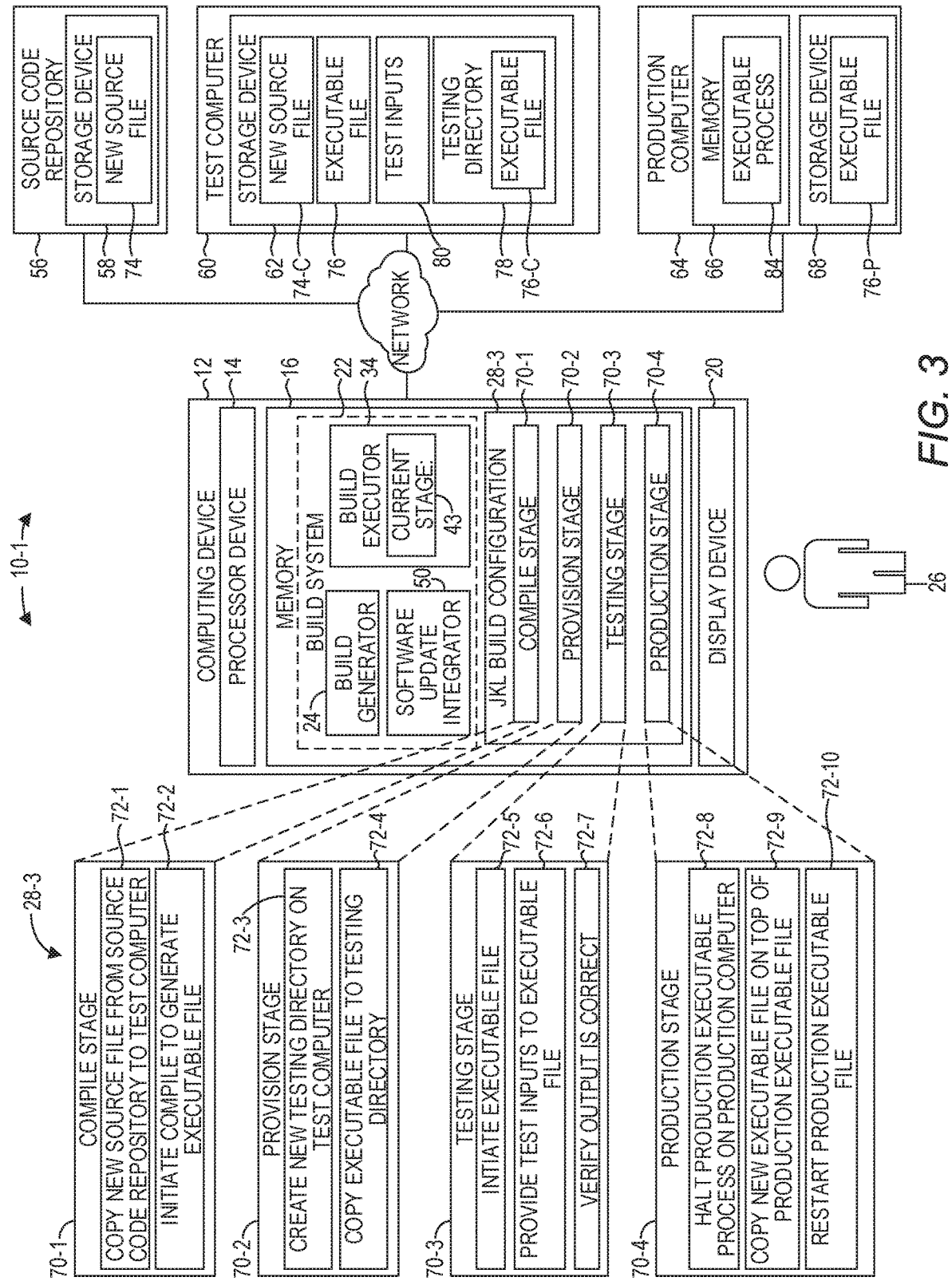
FIG. 3 is a block diagram of an environment illustrating a build configuration in detail.

FIG. 3 is a block diagram of an environment 10-1 illustrating a build configuration 28-3 according to one example. Example processing of the build configuration 28-3 will be discussed to illustrate aspects of the build system 22. The environment 10-1 includes the computing device 12 illustrated in the environment 10 of FIG. 1, although certain aspects of the computing device 12 are not depicted in FIG. 3 for purposes of simplicity. The environment 10-1 also includes a source code repository 56, such as a computer device, or a collection of computing devices, that maintain source code files for projects on one or more storage devices 58. The environment 10-1 includes a test computer 60 which is communicatively coupled to a storage device 62. The environment 10-1 includes a production computer 64 on which production applications are executed to provide services to end users. The production computer 64 includes a memory 66 and is communicatively coupled to a storage device 68.

The build configuration 28-3 contains four stages 70-1-70-4 (generally, stages 70), a first compile stage 70-1 which contains successive steps 72-1-72-2, a second provision stage 70-2 which contains successive steps 72-3-72-4, a third testing stage 70-3 which contains successive steps 72-5-72-7, and a fourth production stage 70-4 which contains successive steps 72-8-72-10. It is noted that for purposes of illustration and ease of explanation, the steps 72-1-72-10 are described functionally in FIG. 3 rather than depicted in a particular syntax, such as a Jenkinsfile syntax.

For purposes of illustration assume that the user 26 has requested the build system 22 to start the build process using the build configuration 28-3. The build system 22 starts the build process sequence. It will also be assumed that the build queue phase 30 (FIG. 1) has completed and that the build system 22 has begun the build run phase 32 (FIG. 1). The build executor 34 sets the current stage counter 43 to stage 1. The build executor 34 accesses the step 72-1 of the compile stage 70-1. In response to the instructions contained in the step 72-1, the build executor 34 copies, or causes to be copied, a new source file 74 from the source code repository 56 to the storage device 62 on the test computer 60 to create a new source file 74-C, which is a copy of the new source file 74. The build executor 34 then accesses the step 72-2 of the compile stage 70-1. In response to the instructions contained in the step 72-2, the build executor 34 initiates a compiler (not illustrated) to compile the new source file 74 on the test computer 60 to generate an executable file 76 on the storage device 62.

After completing the steps in the compile stage 70-1, the build executor 34 increments the current stage counter 43 to reflect that stage 2 is now beginning. The build executor 34 accesses the step 72-3 of the provision stage 70-2. If, for example, at this point, the build generator 24 or software update integrator 50 sends a notification to the build executor 34 of a desired revision to the compile stage 70-1 of the build configuration 28-3, the build executor 34 rejects the proposed revision, as discussed above with regard to FIG. 1. If, on the other hand, the build generator 24 or software update integrator 50 sends a notification to the build executor 34 of a desired revision to the testing stage 70-3, such as to implement different test inputs, and such proposed revisions do not violate any build revision policies 55, the build executor 34 incorporates the proposed revisions into the build configuration 28-3, as discussed above with regard to FIG. 1. After incorporating such revisions into the build configuration 28-3, the build executor 34 continues with the step 72-3 of the provision stage 70-2.

In response to the instructions contained in the step 72-3, the build executor 34 creates, or causes to be created, a testing directory 78 on the storage device 62. The build executor 34 accesses the step 72-4 of the provision stage 70-2. In response to the instructions contained in the step 72-4, the build executor 34 copies the executable file 76 to the testing directory 78 as executable file 76-C.

After completing the steps in the provision stage 70-2, the build executor 34 increments the current stage counter 43 to reflect that stage 3 is now beginning. The build executor 34 accesses the step 72-5 of the testing stage 70-3. In response to the instructions contained in the step 72-5, the build executor 34 initiates the executable file 76-C on the test computer 60. The build executor 34 accesses the step 72-6 of the testing stage 70-3. In response to the instructions contained in the step 72-6, the build executor 34 provides, or causes to be provided, test inputs from a test inputs file 80 to the executable file 76-C. The build executor 34 accesses the step 72-7 of the testing stage 70-3 and verifies, or causes to be verified, the output of the executable file 76-C in response to the test inputs from the test inputs file 80.

After completing the steps in the testing stage 70-3, the build executor 34 increments the current stage counter 43 to reflect that stage 4 is now beginning. The build executor 34 accesses the step 72-8 of the production stage 70-4. In response to the instructions contained in the step 72-8, the build executor 34 halts a current executable process that is currently executing in the memory 66 of the production computer 64. The build executor 34 accesses the step 72-9 of the production stage 70-4. In response to the instructions contained in the step 72-9, the build executor 34 copies the executable file 76-C from the storage device 62 to the storage device 68 as a new production executable file 76-P. The build executor 34 accesses the step 72-10 of the production stage 70-4. In response to the instructions contained in the step 72-10, the build executor 34 initiates the new production executable file 76-P to start a new executable process 84 in the memory 66.

It will be noted that the stages 70 and the steps 72 are merely exemplary, and that a build configuration can contain any number of stages, and any number of steps, that automate any desired activity.

Figure 4:
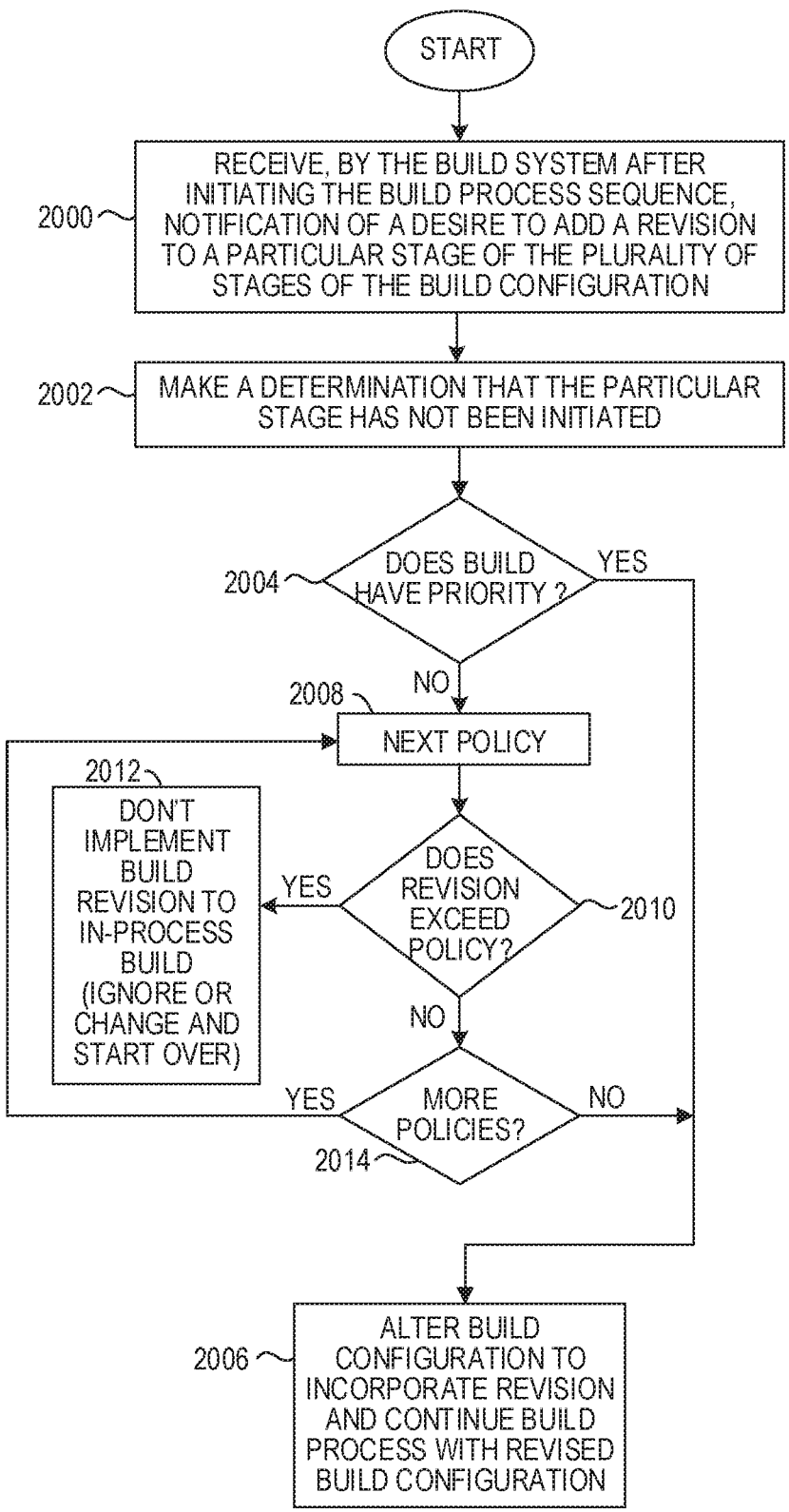
FIG. 4 is a flowchart of a method for implementing predetermined policies in the process of dynamically revising an in-process build according to one example.

FIG. 4 is a flowchart of a method for implementing predetermined policies into the process of dynamically revising an in-process build according to one example. FIG. 4 will be discussed in conjunction with FIG. 1. As discussed with regard to FIG. 1, in some examples the build system 22 may access one or more build revision policies 55 to determine whether proposed revisions to an in-process build will be permitted. Referring now to FIG. 4, assume that the build executor 34 receives notification from the build generator 24 or the software update integrator 50 of a proposed revision to the build configuration 28 after the build process sequence for the build configuration 28 has begun (FIG. 4, block 2000). In the manner discussed above with regard to FIG. 1, in this example the build executor 34 determines that the particular stage associated with the proposed revision has not been initiated (FIG. 4, block 2002). The build executor 34 may first access the priority builds data 57 to determine whether the build configuration 28 has been identified in the priority builds data 57 as a build configuration that has a priority such that the build configuration 28 is not subject to the build revision policies 55 (FIG. 4, block 2004). If the build configuration 28 is identified in the priority builds data 57, the build executor 34 alters the build configuration 28 to incorporate the revision and continues the build process with the revised build configuration 28 (FIG. 4, block 2006).

If the build configuration 28 has not been identified in the priority builds data 57 as a build configuration that has a priority such that the build configuration 28 is not subject to the build revision policies 55, the build executor 34 accesses a first build revision policy 55, such as an IP addresses build revision policy 55-1 that identifies a maximum increase in a number of reserved IP addresses that can be identified in a proposed revision to an in-process build configuration (FIG. 4, block 2008). If the proposed revision does exceed the IP addresses build revision policy 55-1 (FIG. 4, block 2010), the build executor 34 does not incorporate the revision into the in-process build configuration 28 (FIG. 4, block 2012). The build executor 34 may take any of several different actions including, for example, simply ignoring the proposed revision and continuing the in-process build on the build configuration 28, terminating the current in-process build of the build configuration 28, or incorporating the revision into the build configuration 28, and re-starting the build process sequence of the build configuration 28 from the build queue phase 30. If the proposed revision does not exceed the IP addresses build revision policy 55-1, the build executor 34 determines if there are additional build revision policies 55 to be checked (FIG. 4, block 2014). If so, the build executor 34 accesses the next build revision policy 55, such as the servers build revision policy 55-N, and the process repeats. If there are no additional build revision policies 55, and if the proposed revision to the build configuration 28 did not violate any of the build revision policies 55, then the build executor 34 alters the build configuration 28 to incorporate the revision and continues the build process with the revised build configuration 28 (FIG. 4, block 2006).

Figure 5:
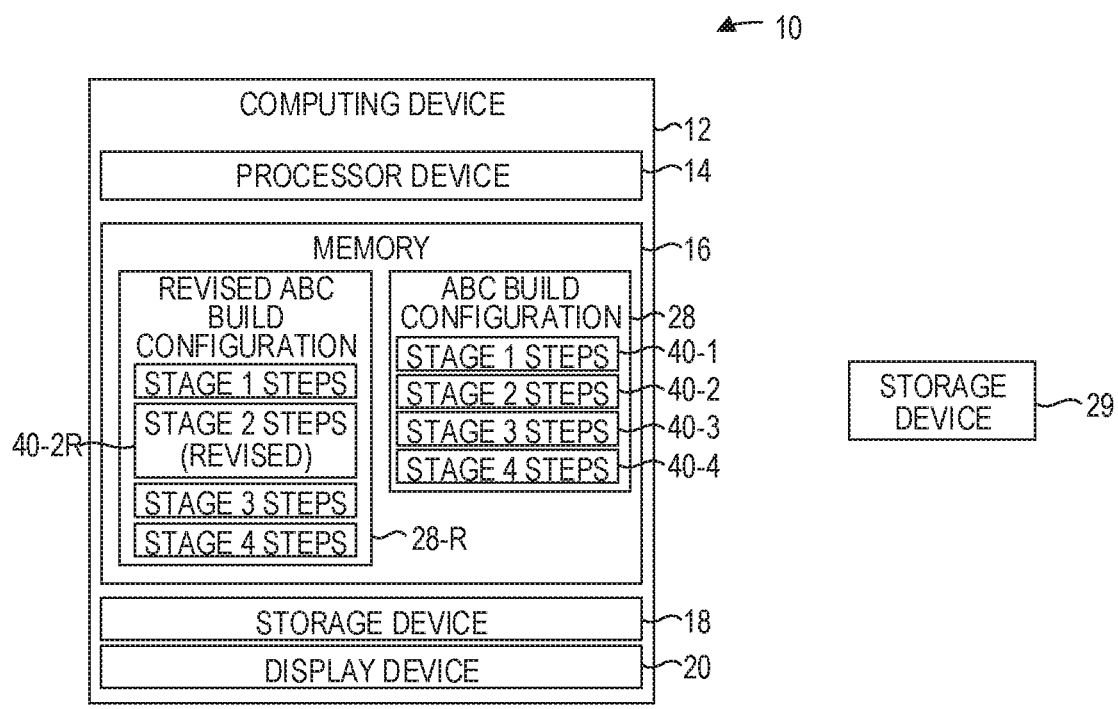
FIG. 5 is a simplified block diagram of the environment illustrated in FIG. 1 according to one example.

FIG. 5 is a simplified block diagram of the environment 10 according to one example. The environment 10 includes the computing device 12, which includes the processor device 14 and the memory 16. The processor device 14 is coupled to the memory 16. The processor device 14 is to receive the build configuration 28 comprising information that identifies the plurality of successive stages 40 each stage 40 comprising at least one step and one or more of the stages 40 comprising a plurality of successive steps. The build configuration 28 defines a build process that, when completed, alters a state of the storage device 29. The processor device 14 is further to initiate a build process sequence on the build configuration 28. The processor device 14 is further to receive, after initiating the build process sequence, notification of a desire to add a revision to a particular stage 40 of the plurality of stages 40 identified in the build configuration 28. The processor device 14 is further to make a determination that performance of the particular stage has or has not begun. In response to the determination, the processor device 14 is further to perform a subsequent build process action.

Figure 6:
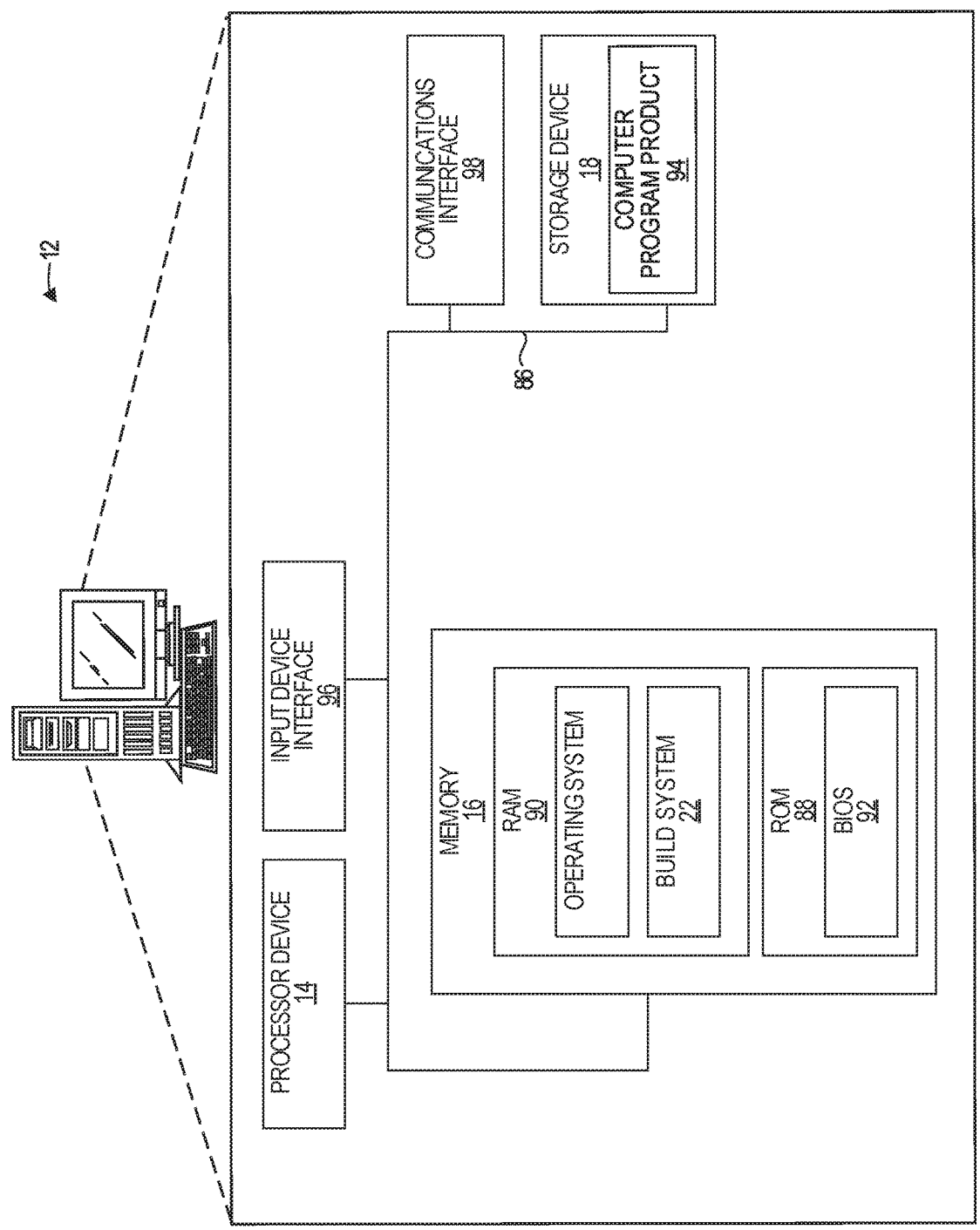
FIG. 6 is a block diagram of a computing device suitable for implementing examples according to one example.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 86. The system bus 86 provides an interface for system components including, but not limited to, the memory 16 and the processor device 14. The processor device 14 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The memory 16 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the computing device 12. The volatile memory 90 may also include a high-speed RAM, such as static RAM, for caching data.

The computing device 12 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 90, including an operating system and one or more program modules, such as the build system 22, which may implement the functionality described herein in whole or in part.

All or a portion of the examples may be implemented as a computer program product 94 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the build system 22 in the volatile memory 90, may serve as a controller, or control system, for the computing device 12 that is to implement the functionality described herein.

An operator, such as the user 26, may also be able to enter one or more configuration commands through a keyboard (not illustrated), a pointing device such as a mouse (not illustrated), or a touch-sensitive surface such as a display device. Such input devices may be connected to the processor device 14 through an input device interface 96 that is coupled to the system bus 86 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 98 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a build system executing on a computing device comprising a processor device, a build configuration comprising information that defines a plurality of successive stages, each stage comprising at least one step, and one or more of the stages comprising a plurality of successive steps, the build configuration defining a build process that, when completed, alters a state of a storage device, wherein the build configuration defines at least one of:
      a compile stage comprising a copying step configured to copy a source file to a destination, and a compilation step configured to generate a new executable file from the source file;
      a provisioning stage comprising a copying step configured to implement the executable file in a test environment; or
      a testing stage comprising an initiation step configured to initiate the executable file as a running process, and an input step to provide the running process with a plurality of predetermined inputs;
   initiating, by the build system, a build process sequence on the build configuration;
   receiving, by the build system after initiating the build process sequence and before the build process sequence terminates, notification of a desire to add a revision to a particular stage of the plurality of stages defined in the build configuration;

making a determination that performance of the particular stage has not begun;

in response to the determination, incorporating the revision into the particular stage defined in the build configuration; and continuing the build process after incorporating the revision into the particular stage defined in the build configuration.

2. The method of claim 1 wherein initiating the build process sequence on the build configuration comprises queuing the build configuration in a build queue containing a plurality of other build configurations, and wherein making the determination that performance of the particular stage has not begun comprises making the determination that the build configuration is in the build queue and that performance of the particular stage has not begun.

3. The method of claim 2 further comprising:
maintaining a same location of the build configuration in the build queue after altering the build configuration.

4. The method of claim 1 further comprising:
initiating performance of a first stage of the build process prior to receiving the notification.

5. The method of claim 4 further comprising halting the build process after receiving the notification and before incorporating the revision into the particular stage defined in the build configuration.

6. The method of claim 1 further comprising:
receiving, by a build generator of the build system via a user interface, a user input that contains a revision to the build configuration;
generating a build revision configuration that reflects the revision to the build configuration; and
sending the build revision configuration to a build executor of the build system.

7. The method of claim 1 further comprising:
receiving a notification that a file associated with the build process requires processing by the build process;
generating a build revision configuration that reflects a revision to the build configuration based on the file; and
sending the build revision configuration to a build executor of the build system.

8. A computing device, comprising:
a memory; and
a processor device coupled to the memory to:
  receive a build configuration comprising information that defines a plurality of successive stages, each stage comprising at least one step, and one or more of the stages comprising a plurality of successive steps, the build configuration defining a build process that, when completed, alters a state of a storage device, wherein the build configuration defines at least one of:
    a compile stage comprising a copying step configured to copy a source file to a destination, and a compilation step configured to generate a new executable file from the source file;
    a provisioning stage comprising a copying step configured to implement the executable file in a test environment; or
    a testing stage comprising an initiation step configured to initiate the executable file as a running process, and an input step to provide the running process with a plurality of predetermined inputs;
  initiate a build process sequence on the build configuration;
  receive, after initiating the build process sequence and before the build process sequence terminates, notification of a desire to add a revision to a particular stage of the plurality of stages defined in the build configuration;
  make a determination that performance of the particular stage has not begun; and
  in response to the determination, incorporate the revision into the particular stage defined in the build configuration; and
  continue the build process after incorporating the revision into the particular stage defined in the build configuration.

9. The computing device of claim 8 wherein to initiate the build process sequence on the build configuration, the processor device is further to queue the build configuration in a build queue containing a plurality of other build configurations, and wherein to make the determination that performance of the particular stage has not begun, the processor device is further to make the determination that the build configuration is in the build queue and that performance of the particular stage has not begun.

10. The computing device of claim 8 wherein the processor device is further to:
initiate performance of a first stage of the build process prior to receiving the notification.

11. A method comprising:
receiving, by a build system executing on a computing device comprising a processor device, a build configuration comprising information that defines a plurality of successive stages, each stage comprising at least one step, and one or more of the stages comprising a plurality of successive steps, the build configuration defining a build process that, when completed, alters a state of a storage device;
initiating, by the build system, a build process sequence on the build configuration;
receiving, by the build system after initiating the build process sequence and before the build process sequence terminates, notification of a desire to add a revision to a particular stage of the plurality of stages defined in the build configuration;
making a determination that performance of the particular stage has begun; and
in response to the determination:
  terminating the build process;
  incorporating the revision into the particular stage defined in the build configuration; and
  restarting the build process from a beginning of the build configuration.

12. A computing device, comprising:
a memory; and
a processor device coupled to the memory to:
  receive a build configuration comprising information that defines a plurality of successive stages, each stage comprising at least one step, and one or more of the stages comprising a plurality of successive steps, the build configuration defining a build process that, when completed, alters a state of a storage device;
  initiate a build process sequence on the build configuration;
  receive, after initiating the build process sequence and before the build process sequence terminates, notification of a desire to add a revision to a particular stage of the plurality of stages defined in the build configuration;
make a determination that performance of the particular stage has begun; and
in response to the determination:
  terminate the build process;
  incorporate the revision into the particular stage defined in the build configuration; and
  restart the build process from a beginning of the build configuration.

* * * * *